United States Patent
Okuda et al.

(10) Patent No.: US 8,741,975 B2
(45) Date of Patent: Jun. 3, 2014

(54) VULCANIZABLE RUBBER COMPOSITION

(75) Inventors: Hiroyuki Okuda, Hiroshima (JP); Takahiro Yoshida, Hiroshima (JP)

(73) Assignee: Nishikawa Rubber Co., Ltd., Hiroshima-shi, Hiroshima-ken (JP)

( * ) Notice: Subject to any disclaimer, the term of this patent is extended or adjusted under 35 U.S.C. 154(b) by 138 days.

(21) Appl. No.: 12/797,715

(22) Filed: Jun. 10, 2010

(65) Prior Publication Data

US 2010/0317758 A1    Dec. 16, 2010

(30) Foreign Application Priority Data

Jun. 12, 2009  (JP) ................................ 2009-140961
Apr. 28, 2010  (JP) ................................ 2010-103579

(51) Int. Cl.
*C08L 47/00*    (2006.01)

(52) U.S. Cl.
USPC ........... 521/134; 521/139; 521/140; 521/142; 521/150

(58) Field of Classification Search
USPC .......................... 521/134, 139, 140, 142, 150
See application file for complete search history.

(56) References Cited

U.S. PATENT DOCUMENTS

| | | | |
|---|---|---|---|
| 6,447,976 B1 * | 9/2002 | Dontula et al. | 430/201 |
| 6,830,799 B1 * | 12/2004 | Duffin et al. | 428/131 |
| 2006/0235095 A1 * | 10/2006 | Leberfinger et al. | 521/56 |
| 2009/0001635 A1 * | 1/2009 | Newson et al. | 264/448 |

FOREIGN PATENT DOCUMENTS

| | | |
|---|---|---|
| JP | S59-001541 | 1/1984 |
| JP | H06-183305 | 7/1994 |
| JP | H08-230472 | 9/1996 |
| JP | 2000-212318 | 8/2000 |
| JP | 2003-002996 | 1/2003 |
| JP | 2007-112244 | 5/2007 |
| JP | 4088429 | 2/2008 |
| JP | 2008-111137 | 5/2008 |
| JP | 2008-115386 | 5/2008 |

OTHER PUBLICATIONS

Expancel, AzkoNobel, Product specification for Expancel Microspheres, 2012.*
JP2008-11173, English Translation of the document, Jan. 2008.*

* cited by examiner

*Primary Examiner* — Irina S Zemel
(74) *Attorney, Agent, or Firm* — Drinker Biddle & Reath LLP

(57) ABSTRACT

The present invention provides a vulcanizable rubber composition containing (A) an ethylene/α-olefin/nonconjugated polyene copolymer rubber, (B) a polyolefin resin and (C) a blowing agent, wherein the polyolefin resin (B) is microdispersed in a melted state in the ethylene/α-olefin/nonconjugated polyene copolymer rubber (A), the polyolefin resin (B) having an average dispersed particle diameter of 2 μm or less, the polyolefin resin (B) is present in an amount of from 5 to 15 parts by mass per 100 parts by mass of the ethylene/α-olefin/nonconjugated polyene copolymer rubber (A), the blowing agent (C) is present in an amount of from 2 to 6 parts by mass per 10 parts by mass of the ethylene/α-olefin/nonconjugated polyene copolymer rubber (A), and the vulcanizable rubber composition has a specific gravity of from 1.05 to 1.15 and a Mooney viscosity (Vm) at 125° C. of from 25 to 55.

11 Claims, No Drawings

VULCANIZABLE RUBBER COMPOSITION

TECHNICAL FIELD

The present invention relates to a vulcanizable rubber composition and its use.

BACKGROUND ART

Due to the escalation of gasoline prices and the limitation of greenhouse gas emissions, it becomes a large issue to enhance the fuel efficiency of vehicles. One of measures therefor is weight reduction of vehicles, and weight reduction is also strongly demanded with respect to weather strip components. An approach adopted for the weight reduction of a rubber product such as weather strip component is to reduce the compounding amount of an additive such as reinforcing agent (e.g., carbon black, silica) that has a larger specific gravity than that of the rubber component and thereby decrease the specific gravity of the rubber product. Also, an approach by foaming a solid rubber portion of a weather strip has been adopted. Here, the blowing agent used is, for example, a chemical blowing agent such as azo compound, nitroso compound, sulfonyl hydrazide compound and azide compound, an inorganic blowing agent, or a thermally expandable capsule. As to the thermally expandable capsule, for example, those containing a low-boiling-point hydrocarbon in a shell wall are known (See Patent Document 1).

On the other hand, with respect to a vulcanizable rubber composition, a composition containing an ethylene/α-olefin/nonconjugated polyene copolymer rubber as the main material is known, and known examples thereof include a rubber composition obtained by finely dispersing an olefin-based resin in an ethylene-propylene-diene rubber (EPDM) (See Patent Documents 2 and 3).

CITATION OF RELATED ART

Patent Document

Patent Document 1: JP-A-2007-112244
Patent Document 2: Japanese Patent No. 4,088,429
Patent Document 3: JP-A-2008-111137

SUMMARY OF THE INVENTION

However, the chemical blowing agent has a problem of embracing a large bubble between a weather strip and a metal core, because the amount of gas generated upon foaming and vulcanization is large. As for the thermally expandable capsule, the shell wall is mostly an acrylic resin material and this results in poor compatibility in the case where the main material is an ethylene/α-olefin/nonconjugated polyene copolymer rubber. Accordingly, when the thermally expandable capsule is incorporated in a large amount with an attempt to reduce the specific gravity, this leads to extreme reduction in strength or deterioration in compression set.

Thus, there are limitations in reducing the specific gravity. At present, a specific gravity after vulcanization has not been made smaller than at about 0.90.

The present invention has been made by taking these problems into consideration, and an object of the present invention is to provide a rubber composition enabling further weight reduction.

Other objects and effects of the present invention will become apparent from the following description.

As a result of intensive studies made by the present inventors, it was found that the above-described objects can be attained by providing the following vulcanizable rubber compositions and rubber product.

That is, the present invention relates to the subject matter as described below.

(1) A vulcanizable rubber composition containing (A) an ethylene/α-olefin/nonconjugated polyene copolymer rubber, (B) a polyolefin resin and (C) a blowing agent, wherein
the polyolefin resin (B) is microdispersed in a melted state in the ethylene/α-olefin/nonconjugated polyene copolymer rubber (A), the polyolefin resin (B) having an average dispersed particle diameter of 2 μm or less,
the polyolefin resin (B) is present in an amount of from 5 to 15 parts by mass per 100 parts by mass of the ethylene/α-olefin/nonconjugated polyene copolymer rubber (A),
the blowing agent (C) is present in an amount of from 2 to 6 parts by mass per 100 parts by mass of the ethylene/α-olefin/nonconjugated polyene copolymer rubber (A), and
the vulcanizable rubber composition has a specific gravity of from 1.05 to 1.15 and a Mooney viscosity (Vm) at 125° C. of from 25 to 55.

(2) The rubber composition according to item (1) above, wherein the blowing agent (C) comprises a thermally expandable capsule.

(3) The rubber composition according to item (2) above, wherein the thermally expandable capsule has an average particle diameter before expansion of from 3 to 20 μm.

(4) The rubber composition according to any one of items (1) to (3) above, which provides a vulcanized composition having a specific gravity of from 0.5 to 0.8, a hardness of from 35 to 65, a tensile strength of from 3.5 to 7 MPa, an elongation of from 100 to 500%, and a compression set at 70° C. for 72 hours of from 30 to 50%.

(5) A rubber product with a specific gravity of from 0.5 to 0.8, obtained by vulcanizing the rubber composition according to any one of items (1) to (4) above.

According to the present invention, a rubber composition enabling further weight reduction can be provided by exquisitely adjusting the composition, the viscosity, and the compounding amount of the olefin-based resin which is finely dispersed. Also, according to the present invention, even when the compounding amount of a reinforcing agent or inorganic filler having a large specific gravity is decreased with an attempt to reduce the specific gravity, a rubber composition having good roll workability and extrusion processability can be provided.

DETAILED DESCRIPTION OF THE INVENTION

The present invention is described in detail below.
<Ethylene/α-Olefin/Nonconjugated Polyene Copolymer Rubber (A)>

The ethylene/α-olefin/nonconjugated polyene copolymer rubber (A) (hereinafter simply referred to as a "copolymer rubber (A)") contained in the rubber composition of the present invention is a polymer where ethylene, α-olefin and nonconjugated polyene are randomly copolymerizd.

The α-olefin includes, for example, an α-olefin having a carbon number of 3 to 12, and specific examples thereof include propylene, 1-butene, 1-pentene, 3-methyl-1-butene, 1-hexene, 3-methyl-1-pentene, 4-methyl-1-pentene, 3-ethyl-1-pentene, 1-octene, 1-decene and 1-undecene. One of these α-olefins may be used singly, or two or more thereof may be used in combination.

As for the nonconjugated polyene, a cyclic or chain nonconjugated polyene may be used. Examples thereof include 1,4-pentadiene, 1,4-hexadiene, 1,5-hexadiene, 1,7-octadiene, 1,9-decadiene, 3,6-dimethyl-1,7-octadiene, 4,5-dimethyl-1,7-octadiene, 5-methyl-1,8-nonadiene, dicyclopentadiene, 5-ethylidene-2-norbornene, 5-vinyl-2-norbornene and 2,5-norbornadiene. One of these nonconjugated polyenes may be used singly, or a mixture of two or more thereof may be used.

<Polyolefin Resin (B)>

The polyolefin resin (B) for use in the present invention is a thermoplastic resin, and specific examples thereof include ethylene homopolymers such as high-density polyethylene (HDPE), medium-density polyethylene (MDPE), low-density polyethylene (LDPE) and linear low-density polyethylene (LLDPE), and crystalline ethylene/$\alpha$-olefin copolymers composed of ethylene and an $\alpha$-olefin having a carbon number of 3 to 20, preferably from 3 to 8; polypropylene such as propylene homopolymers, propylene block copolymers and propylene random copolymers; and crystalline homopolymers or copolymers of an $\alpha$-olefin having a carbon number of 3 to 20, preferably from 3 to 8, e.g., propylene, 1-butene, 4-methyl-1-pentene, 1-hexene, 1-heptene, 1-octane. The melting point of these polyolefins is 250° C. or less. Above all, polyethylene and polypropylene are preferred, and polyethylene is more preferred.

In the present invention, the compounding amount of the polyolefin resin (B) is from 5 to 15 parts by mass, preferably from 8 to 12 parts by mass, per 100 parts by mass of the ethylene/$\alpha$-olefin/nonconjugated polyene copolymer (A). With the compounding amount of the polyolefin resin (B) in the above-described range, the roll workability or extrusion processability can be kept good even when the compounding amount of a reinforcing agent or inorganic filler having a large specific gravity is decreased.

In the present invention, the polyolefin resin (B) is microdispersed in a melted state in the ethylene/$\alpha$-olefin/nonconjugated polyene copolymer rubber (A). The term "microdispersed" means that the polyolefin resin (B) is uniformly and finely dispersed in the ethylene/$\alpha$-olefin/nonconjugated polyene copolymer (A). The average dispersed particle diameter (as determined from the electron micrograph) of the microdispersed polyolefin resin (B) is usually 2 µm or less.

The method for microdispersing the polyolefin resin (B) in a melted state in the ethylene/$\alpha$-olefin/nonconjugated polyene copolymer rubber (A) to an average dispersed particle diameter of 2 µm or less includes mixing in accordance with the method described in Japanese Patent No. 4,088,429.

For example, there may be used a method of kneading them, optionally together with other components such as reinforcing agent, filler and plasticizer, at a temperature not lower than the melting point of the polyolefin resin (B) by using a Banbury mixer, an internal mixer, a kneader, an open roll or the like, which are usually used as a rubber kneader. Since kneading defects of the polyolefin resin (B) are highly likely to become an extraneous substance, the kneading is preferably performed under the conditions of a kneading temperature of 80 to 250° C., a kneading time of 1 to 20 minutes, preferably from 1 to 10 minutes, and a kneading/blending specific energy of 0.001 to 10 Kw·h/kg.

Another preferred kneading method is a method of previously adding the polyolefin resin (B) to a rubber mixture containing the copolymer rubber (A) and an organic solvent, and subjecting the mixture to kneading and removal of the solvent to prepare a kneaded material in which the polyolefin resin (B) is uniformly dispersed in the copolymer rubber (A), followed by the addition of additives such as reinforcing material, filler, plasticizer and blowing agent (C), and kneading.

<Blowing Agent (C)>

The rubber composition of the present invention preferably contains a thermally expandable capsule as a blowing agent (C). This makes it possible to reduce the amount of gas generated and prevent abnormal foaming between a metal core and rubber.

The thermally expandable capsule preferably comprises a shell wall and a gas or gasification material contained in the shell wall. The material constituting the shell wall is preferably a thermoplastic polymer, and examples thereof include an acrylic resin such as acrylonitrile, a styrene-based polymer, an acrylonitrile/vinylidene chloride copolymer, a silicone resin, a urethane resin and an amide resin. The gas or gasification material is preferably a low-boiling-point hydrocarbon that is liquid at room temperature, and examples thereof include isobutane, normal butane, normal pentane and isopentane.

The thermally expandable capsule before expansion preferably has the following physical properties.

The average particle diameter is preferably from 3 to 30 µm, more preferably from 3 to 20 µm, and still further preferably 5 to 15 µm. The average particle diameter in this range is preferred in view of rubber properties or external appearance after vulcanization.

The foaming start temperature is preferably from 80 to 150° C., more preferably 90 to 150° C., and still further preferably 110 to 150° C. The foaming start temperature in this range is preferred in view of workability of rubber kneading and surface appearance of vulcanized rubber.

The maximum expansion temperature is preferably from 110 to 180° C. and more preferably 130 to 150° C. The maximum expansion temperature in this range is preferred in view of workability of rubber kneading and surface appearance of vulcanized rubber.

As for the blowing agent (C), a blowing agent other than a thermally expandable capsule may be used in combination. The other blowing agent is preferably, for example, a chemical blowing agent or an inorganic blowing agent. Examples of the chemical blowing agent include an azo compound, a nitroso compound, a sulfonyl hydrazide compound and an azide compound. Examples of the inorganic blowing agent include sodium hydrogencarbonate. The ratio by mass of the thermally expandable capsule to the other blowing agent is preferably from 5:5 to 10:0.

In the present invention, the compounding amount of the blowing agent (C) is from 2 to 6 parts by mass, preferably from 3 to 5 parts by mass, per 100 parts by mass of the ethylene/$\alpha$-olefin/nonconjugated polyene copolymer rubber (A). The compounding amount of the blowing agent (C) in such a range is preferred because the physical properties of rubber, particularly the compression set, can be prevented from deterioration. When the blowing agent (C), particularly, the thermally expandable capsule using an acrylic resin material as the shell wall, is incorporated in a large amount with an attempt to lower the specific gravity of the rubber product, this leads to deterioration in strength or compression set of the rubber product because of poor compatibility with EPDM rubber that is the main rubber material. In this connection, the rubber composition of the present invention can realize a low specific gravity even when the compounding amount of the blowing agent (C) is reduced.

<Other Additives>

In addition to the ethylene/$\alpha$-olefin/nonconjugated polyene copolymer rubber (A), the polyolefin resin (B) and the blowing agent (C), the rubber composition of the present invention may contain, if necessary, other additives such as plasticizer (softener vulcanizing agent, vulcanization accelerator, vulcanization acceleration aid, processing aid, reinforcing material and inorganic filler.

As for the plasticizer (softener), a plasticizer usually employed for rubber is used. Specific examples thereof include a vegetable oil-based softener, a mineral oil-based softener and a synthetic plasticizer. Above all, a mineral oil-based softener is preferably used. The compounding amount of the plasticizer is preferably from 50 to 150 parts by mass per 100 parts by mass of the copolymer rubber (A).

Examples of the vulcanizing agent include sulfur, an organic sulfur-containing compound, and sulfur chloride. The compounding amount of the vulcanizing agent is preferably from 1 to 3 parts by mass per 100 parts by mass of the copolymer rubber (A).

In the case of using a vulcanizing agent, a vulcanization accelerator and/or a vulcanization acceleration aid is preferably used in combination. Specific examples of the vulcanization accelerator include thioureas, thiazoles, sulfenamides, thiurams and dithiocarbamates. The compounding amount of the vulcanization accelerator is preferably from 2 to 15 parts by mass per 100 parts by mass of the copolymer rubber (A). Examples of the vulcanization acceleration aid include zinc oxide (zinc flower). The compounding amount of vulcanization acceleration aid is preferably from 3 to 7 parts by mass per 100 parts by mass of the copolymer rubber (A).

Examples of the processing aid include polyethylene glycol and stearic acid. The compounding amount of the processing aid is preferably from 1 to 5 parts by mass per 100 parts by mass of the copolymer rubber (A).

Examples of the reinforcing material include carbon black and silica. The compounding amount of the reinforcing material is preferably from 80 to 130 parts by mass per 100 parts by mass of the copolymer rubber (A).

Examples of the inorganic filler include talc, clay and calcium carbonate. The compounding amount of the inorganic filler is 0 to 50 parts by mass per 100 parts by mass of the copolymer rubber (A).

<Physical Properties of Rubber Composition>

The specific gravity of the vulcanizable rubber composition of the present invention is from 1.05 to 1.15, preferably from 1.08 to 1.13. The specific gravity in the range above before vulcanization is preferred in view of workability of rubber kneading and reduction in the amount of blowing agent.

The Mooney viscosity (Vm) at 125° C. of the rubber composition of the present invention is from 25 to 55, preferably from 30 to 50, and more preferably from 40 to 50. If the Mooney viscosity (Vm) is less than 25, the shape retentivity may be deteriorated, whereas if it exceeds 55, a large amount of the blowing agent is required to attain a desired specific gravity, resulting in marked deterioration in physical properties of the vulcanized rubber. Within the above-described Mooney viscosity range, the rubber composition of the present invention is suitable for mass production. The Mooney viscosity referred to herein is the value according to JIS K6301 (2009). Further, in the case where the Mooney viscosity at 125° C. is within the range of 25 to 40, the rubber composition of the present invention can be obtained regardless of production volume. In this connection, the Mooney viscosity at 125° C. can be adjusted by increasing or decreasing the amounts of the reinforcing material (particularly, carbon black) or inorganic filler and the softener or by changing the viscosity of the polymer.

The rubber composition of the present invention has the following characteristics as the physical properties after vulcanization. That is, the specific gravity is from 0.5 to 0.8, preferably from 0.65 to 0.75, the hardness is from 35 to 65, the tensile strength is from 3.5 to 7 MPa, the elongation is from 100 to 500%, and the compression set at 70° C. for 72 hours is from 30 to 50%.

The above-mentioned specific gravity, hardness (Mooney scorch), tensile strength, elongation, and compression set are values according to the method A of JIS K6268 (2009), JIS K6301 (2009), JIS K6251 (2009), JIS K6251 (2009), and JIS K6262 (2009), respectively.

<Production Method of Rubber Composition>

The vulcanizable rubber composition of the present invention can be prepared, for example, by the following method.

For example, a polyolefin resin (B) in the compounding amount range of the present invention is previously melt-blended per 100 parts by mass of an ethylene/α-olefin/nonconjugated polyene copolymer rubber (A) at a temperature not lower than the melting point of the polyolefin resin (B) to prepare a polymer alloy in which the polyolefin resin (B) is dispersed in the copolymer rubber (A) to an average particle diameter of 2 μm or less.

The composition may also be prepared as follows. A polymer alloy obtained in the same manner as mentioned above except for blending the polyolefin resin (B) to be contained in excess of the compounding amount range of the present invention per 100 parts by mass of the ethylene/α-olefin/nonconjugated polyene copolymer rubber (A) is prepared. As such a resin alloy, for example, EPTALLOY produced by Mitsui Chemicals, Inc. can be used. An ethylene/α-olefin/nonconjugated polyene copolymer rubber (A) is added thereto to adjust the compounding amount of the polyolefin resin (B) to fall within the range of the present invention. At this time, the copolymer rubber (A) added later may be of the same grade as the copolymer rubber (A) previously blended with the polyolefin resin (B) or may be of another different grade.

Subsequently, out of the above-described other additives, carbon black, a softener and a processing aid are blended therewith, according to need, and the mixture is kneaded by a mixer such as Banbury mixer. The kneading time is preferably from about 3 to 6 minutes. Thereafter, a blowing agent (C), a vulcanizing agent and a vulcanization accelerator are additionally mixed by using rolls such as open roll, and the mixture is kneaded at a roll temperature of 20 to 30° C. for 8 to 15 minutes and then sheeted out to obtain a rubber composition.

<Rubber Product>

By vulcanizing the vulcanizable rubber composition of the present invention obtained above, the rubber product of the present invention can be obtained. The vulcanization conditions are not particularly limited and may be, for example, a vulcanization temperature of 250° C. and a vulcanization time of 5 minutes.

The rubber product of the present invention has a specific gravity of 0.5 to 0.8, preferably from 0.65 to 0.75, a hardness of 35 to 65, a tensile strength of 3.5 to 7 MPa, an elongation of 100 to 500%, and a compression set of 30 to 50% at 70° C. for 72 hours.

EXAMPLES

The present invention will be illustrated in greater detail with reference to the following Examples and Comparative Examples, but the present invention should not be construed as being limited to these Examples.

Examples 1-1 to 1-7, Comparative Examples 1-1 to 1-3 and Reference Examples 1-1 to 1-2

A polymer alloy (EPTALLOY, produced by Mitsui Chemicals, Ind.) where 20 parts by mass of a polyethylene resin (B)

is incorporated per 100 parts by mass of an ethylene/propylene/5-ethylidene-2-norbornene random copolymer rubber (A1) using 5-ethylidene-2-norbornene (ENB) as a nonconjugated polyene and where the polyethylene resin (B) is microdispersed in a melted state in the copolymer rubber (A1) and the average dispersed particle diameter of the polyethylene resin (B) is 2 µm or less, was prepared. With the polymer alloy, the respective components other than (A1) and (B) were blended according to the compounding ratio shown in Table 2 to prepare a rubber composition. Each rubber composition was extruded into a plate shape and crosslinked by a vulcanization treatment at 250° C. for 5 minutes to obtain a test specimen.

Examples 2-1 to 2-9 and Comparative Example 2-1

With the polymer alloy (EPTALLOY, produced by Mitsui Chemicals, Ind.) used in Example 1-1, etc., the respective components other than (A1) and (B) were blended according to the compounding ratio shown in Table 3 to prepare a rubber composition. Each rubber composition was extruded into a plate shape and crosslinked by a vulcanization treatment at 250° C. for 5 minutes to obtain a test specimen. For these Examples, the rubber compositions were prepared using a mass production apparatus which is capable of production of about 60-times larger amount than that in Example 1-1 and with which the rubber composition temperature at the respective step of blending and extrusion processing becomes higher than that in Example 1 by about 10° C. or more.

The constitutions of ethylene/α-olefin/nonconjugated polyene copolymer rubbers (A2) to (A4) in Tables 2 and 3 are shown in Table 1 below.

TABLE 1

| | Mooney Viscosity at 100° C. (Vm) (ML1 + 4) | Ethylene Content | Propylene Content | Diene Content |
|---|---|---|---|---|
| Copolymer Rubber (A2) | 20 | 50 mass % | 45 mass % | 5 mass % |
| Copolymer Rubber (A3) | 70 | 50 mass % | 45 mass % | 5 mass % |
| Copolymer Rubber (A4) | 40 | 55 mass % | 40 mass % | 5 mass % |

Also, as for the blowing agent (C), the following (C1) to (C3) were used.

Thermally expandable capsule (C1): F-46K, produced by Matsumoto Yushi-Seiyaku Co., Ltd.; particle diameter, 8-14 µm; foaming start temperature, 90-100° C.; maximum expansion temperature, 130-140° C.

Thermally expandable capsule (C2): F-77, produced by Matsumoto Yushi-Seiyaku Co., Ltd., particle diameter, 20-30 µm; foaming start temperature, 110-120° C.; maximum expansion temperature, 160-170° C.

OBSH(C3): p,p'-oxybis(benzenesulfonyl hydrazide)

Furthermore, in Tables 2 and 3, carbon black N550 is Carbon Black Asahi 60G produced by Asahi Carbon Co., Ltd., and the vulcanization accelerator is a mixture of thiazoles, thiurams, dithiocarbamates and the like.

Each of the test specimens of Examples 1-1 to 1-7, Comparative Example 1-1 to 1-3 and Reference Examples 1-1 to 1-2 was evaluated for the following physical properties.

Specific gravity (measured in accordance with the method A of JIS K6268 (2009))

Tensile strength (measured on No. 3 dumbbell specimen in accordance with JIS K6251 (2009))

Elongation (measured on No. 3 dumbbell specimen in accordance with JIS K6251 (2009))

Compression set at 70° C. for 72 hours (measured in accordance with JIS K6262 (2009))

Mooney viscosity (Vm) (measured in accordance with JIS K6301 (2009))

Mooney scorch (hardness) (measured in accordance with JIS K6301 (2009))

Roll workability (the presence or absence of malfunction such as bagging during roll operation was examined and evaluated as follows.

A: No malfunction such as bagging occurred;
B: Malfunctions to an extent that gave no problem in operation were observed;
C: Malfunctions to an extent that gave problems in operation were observed.

In general, the "no malfunction such as bagging occurred" is a level which gives an expectation that a mass production is possible. The "malfunctions to an extent that gave no problem in operation were observed" is a level which gives an expectation that a mass production with a stable cycle without disturbing operation protocols will be possible if more trouble is taken. The "malfunctions to an extent that gave problems in operation were observed" is a level which gives an expectation that operation protocols will not be followed and a mass production with a stable cycle will be impossible.

Extrusion property (the external appearance (sharpness and continuity) of the edge portion of an extrudate by a Garvey die was examined in accordance with ASTM D2230 (2007) and evaluated as follows.

A: No abnormality was observed;
C: An abnormality (such as poor sharpness or an intermittent extrusion state) was observed.

In general, the "an abnormality was observed" is a level which gives an expectation that a mass production will be impossible).

Abnormal bubble (A: No abnormal bubble was observed at the interspace with the metal core, B: Abnormal bubbles were infrequently generated, C: Abnormal bubbles were frequently generated.)

External appearance (A: No abnormality, C: A level unusable for an exterior surface)

The results are shown in Table 2 below.

TABLE 2

| | | Ex. 1-1 | Ex. 1-2 | Ex. 1-3 | Ex. 1-4 | Ex. 1-5 | Ex. 1-6 | Ex. 1-7 | Comp. Ex. 1-1 | Comp. Ex. 1-2 | Comp. Ex. 1-3 | Ref. Ex. 1-1 | Ref. Ex. 1-2 |
|---|---|---|---|---|---|---|---|---|---|---|---|---|---|
| Materials | Copolymer rubber (A) | | | | | | | | | | | | |
| (parts by mass) | (A1) | 58 | 58 | 48 | 44 | 58 | 58 | 58 | 28 | 28 | 100 | 58 | 28 |
| | (A2) | 42 | | | | | | | | | | | |
| | (A3) | | | | | | | | 72 | 72 | | 42 | 72 |
| | (A4) | | 42 | 52 | 56 | 42 | 42 | 42 | | | | | |
| | Polyethylene (B) | 11.5 | 11.5 | 9.5 | 8.8 | 11.5 | 11.5 | 11.5 | 5.7 | 5.7 | 20 | 11.5 | 5.7 |

TABLE 2-continued

|  |  | Ex. 1-1 | Ex. 1-2 | Ex. 1-3 | Ex. 1-4 | Ex. 1-5 | Ex. 1-6 | Ex. 1-7 | Comp. Ex. 1-1 | Comp. Ex. 1-2 | Comp. Ex. 1-3 | Ref. Ex. 1-1 | Ref. Ex. 1-2 |
|---|---|---|---|---|---|---|---|---|---|---|---|---|---|
|  | Blowing agent (C) |  |  |  |  |  |  |  |  |  |  |  |  |
|  | Thermally expandable capsule (C1) | 4 | 4 | 4 | 4 | 2 | 1 |  | 0.7 | 7 | 4 | 4 | 4 |
|  | Thermally expandable capsule (C2) |  |  |  |  |  |  | 4 |  |  |  |  |  |
|  | OBSH (C3) |  |  |  |  | 2 | 3 |  |  |  |  |  |  |
|  | Carbon black N550 | 110 | 110 | 110 | 110 | 110 | 110 | 110 | 160 | 160 | 110 | 110 | 110 |
|  | Process oil (mineral oil-based softener) | 70 | 70 | 70 | 70 | 70 | 70 | 70 | 100 | 100 | 70 | 70 | 70 |
|  | Stearic acid | 1 | 1 | 1 | 1 | 1 | 1 | 1 | 1 | 1 | 1 | 1 | 1 |
|  | Polyethylene glycol | 1 | 1 | 1 | 1 | 1 | 1 | 1 | 1 | 1 | 1 | 1 | 1 |
|  | Zinc oxide | 5 | 5 | 5 | 5 | 5 | 5 | 5 | 5 | 5 | 5 | 5 | 5 |
|  | Sulfur | 2 | 2 | 2 | 2 | 2 | 2 | 2 | 2 | 2 | 2 | 2 | 2 |
|  | Vulcanization accelerator | 4 | 4 | 4 | 4 | 4 | 4 | 4 | 4 | 4 | 4 | 4 | 4 |
| Physical Properties before Vulcanization |  |  |  |  |  |  |  |  |  |  |  |  |  |
| Specific gravity |  | 1.11 | 1.11 | 1.11 | 1.11 | 1.11 | 1.11 | 1.11 | 1.17 | 1.17 | 1.11 | 1.11 | 1.12 |
| Mooney viscosity Vm (125° C.) |  | 29 | 35 | 35 | 35 | 35 | 35 | 35 | 46 | 40 | 38 | 41 | 44 |
| Physical Properties after Vulcanization |  |  |  |  |  |  |  |  |  |  |  |  |  |
| Specific gravity |  | 0.70 | 0.71 | 0.69 | 0.72 | 0.68 | 0.67 | 0.71 | 1.08 | 0.73 | 0.70 | 0.72 | 0.77 |
| Hardness |  | 55 | 55 | 55 | 55 | 53 | 53 | 55 | 73 | 57 | 57 | 56 | 54 |
| Tensile strength MPa |  | 4.0 | 4.2 | 4.1 | 4.6 | 4.0 | 3.9 | 4.2 | 11.1 | 3.9 | 3.8 | 4.3 | 4.0 |
| Elongation % |  | 330 | 310 | 320 | 310 | 280 | 270 | 310 | 440 | 310 | 300 | 350 | 370 |
| Compression set % |  | 42 | 38 | 36 | 38 | 35 | 34 | 38 | 40 | 59 | 35 | 34 | 29 |
| Roll workability |  | A | A | A | A | A | A | A | A | A | B | C | C |
| Extrusion property |  | A | A | A | A | A | A | A | A | A | C | C | C |
| Abnormal bubble |  | A | A | A | A | B | C | A | A | A | A | A | A |
| Surface appearance |  | A | A | A | A | A | A | C | A | A | A | A | A |

Each of the test specimens of Examples 2-1 to 2-9 and Comparative Example 2-1 was evaluated for the following physical properties.
Specific gravity (measured in accordance with the method A of JIS K6268 (2009))
Tensile strength (measured on No. 3 dumbbell specimen in accordance with JIS K6251 (2009))
Elongation (measured on No. 3 dumbbell specimen in accordance with JIS K6251 (2009))
Compression set at 70° C. for 72 hours (measured in accordance with JIS K6262 (2009))
Mooney viscosity (Vm) (measured in accordance with JIS K6301 (2009))
Mooney scorch (hardness) (measured in accordance with JIS K6301 (2009))
Roll workability (the presence or absence of malfunction such as bagging during roll operation was examined and evaluated as follows.
A: No malfunction such as bagging occurred;
B: Malfunctions to an extent that gave no problem in operation were observed;
C: Malfunctions to an extent that gave problems in operation were observed.

In general, the "no malfunction such as bagging occurred" is a level where a mass production is possible. The "malfunctions to an extent that gave no problem in operation were observed" is a level where a mass production is possible but hardly attained. The "malfunctions to an extent that gave problems in operation were observed" is a level where a mass production is impossible.
Extrusion property (the external appearance (sharpness and continuity) of the edge portion of an extrudate by a Garvey die was examined in accordance with ASTM D2230 (2007) and evaluated as follows.
A: No abnormality was observed;
C: An abnormality (such as poor sharpness or an intermittent extrusion state) was observed.
In general, the "an abnormality was observed" is a level where a mass production is impossible).
Abnormal bubble (A: No abnormal bubble was observed at the interspace with the metal core, B: Abnormal bubbles were infrequently generated, C: Abnormal bubbles were frequently generated.)
External appearance (A: No abnormality, C: A level unusable for an exterior surface)
The results are shown in Table 3 below.

TABLE 2

|  |  |  | Ex. 2-1 | Ex. 2-2 | Ex. 2-3 | Ex. 2-4 | Ex. 2-5 | Ex. 2-6 | Ex. 2-7 | Ex. 2-8 | Ex. 2-9 | Comp. Ex. 2-1 |
|---|---|---|---|---|---|---|---|---|---|---|---|---|
| Materials | Copolymer rubber (A) |  |  |  |  |  |  |  |  |  |  |  |
| (parts by mass) | (A1) |  | 58 | 58 | 48 | 44 | 58 | 58 | 58 | 58 | 28 | 100 |
|  | (A2) |  |  | 42 |  |  |  |  |  |  |  |  |
|  | (A3) |  |  |  |  |  |  |  |  |  | 42 | 72 |

TABLE 2-continued

|  | Ex. 2-1 | Ex. 2-2 | Ex. 2-3 | Ex. 2-4 | Ex. 2-5 | Ex. 2-6 | Ex. 2-7 | Ex. 2-8 | Ex. 2-9 | Comp. Ex. 2-1 |
|---|---|---|---|---|---|---|---|---|---|---|
| (A4) |  | 42 | 52 | 56 | 42 | 42 | 42 |  |  |  |
| Polyethylene (B) | 11.5 | 11.5 | 9.5 | 8.8 | 11.5 | 11.5 | 11.5 | 11.5 | 5.7 | 20 |
| Blowing agent (C) |  |  |  |  |  |  |  |  |  |  |
| Thermally expandable capsule (C1) | 4 | 4 | 4 | 4 | 2 | 1 |  | 4 | 4 | 4 |
| Thermally expandable capsule (C2) |  |  |  |  |  |  | 4 |  |  |  |
| OBSH (C3) |  |  |  |  | 2 | 3 |  |  |  |  |
| Carbon black N550 | 110 | 115 | 115 | 115 | 115 | 115 | 115 | 115 | 115 | 115 |
| Process oil (mineral oil-based softener) | 70 | 60 | 60 | 60 | 60 | 60 | 60 | 60 | 60 | 60 |
| Stearic acid | 1 | 1 | 1 | 1 | 1 | 1 | 1 | 1 | 1 | 1 |
| Polyethylene glycol | 1 | 1 | 1 | 1 | 1 | 1 | 1 | 1 | 1 | 1 |
| Zinc oxide | 5 | 5 | 5 | 5 | 5 | 5 | 5 | 5 | 5 | 5 |
| Sulfur | 2 | 2 | 2 | 2 | 2 | 2 | 2 | 2 | 2 | 2 |
| Vulcanization accelerator | 4 | 4 | 4 | 4 | 4 | 4 | 4 | 4 | 4 | 4 |
| Physical Properties before Vulcanization |  |  |  |  |  |  |  |  |  |  |
| Specific gravity | 1.12 | 1.12 | 1.12 | 1.12 | 1.12 | 1.12 | 1.12 | 1.12 | 1.12 | 1.12 |
| Mooney viscosity Vm (125° C.) | 29 | 43 | 43 | 43 | 43 | 43 | 43 | 50 | 53 | 47 |
| Physical Properties after Vulcanization |  |  |  |  |  |  |  |  |  |  |
| Specific gravity | 0.73 | 0.74 | 0.73 | 0.74 | 0.70 | 0.69 | 0.71 | 0.74 | 0.77 | 0.74 |
| Hardness | 55 | 55 | 55 | 55 | 53 | 53 | 55 | 56 | 54 | 57 |
| Tensile strength MPa | 4.0 | 4.5 | 4.7 | 4.5 | 4.2 | 4.1 | 4.3 | 4.3 | 4.0 | 3.8 |
| Elongation % | 330 | 310 | 320 | 310 | 280 | 270 | 310 | 350 | 370 | 300 |
| Compression set % | 42 | 42 | 42 | 42 | 42 | 39 | 42 | 43 | 43 | 43 |
| Roll workability | A | A | A | A | A | A | A | A | A | B |
| Extrusion property | A | A | A | A | A | A | A | A | A | C |
| Abnormal bubble | A | A | A | A | B | C | A | A | A | A |
| Surface appearance | A | A | A | A | A | A | C | A | A | A |

It is seen from the results in Tables 2 and 3 that the rubber compositions of the Invention Examples are excellent in various physical properties as typified by specific gravity. It can be seen that the rubber compositions of Examples 2-2 to 2-9 having a Mooney viscosity higher than that of Example 1-1 are also excellent as well as Example 1-1 in various physical properties as typified by specific gravity.

On the other hand, the rubber composition of Comparative Example 1-1 where the compounding amount of the blowing agent (C) was smaller than the range of the present invention did not have a specific gravity before and after vulcanization falling within a desired range. With the rubber composition of Comparative Example 1-2 where the compounding amount of the blowing agent (C) exceeded the range of the present invention, sufficient compression set was not obtained. With the rubber compositions of Comparative Example 1-3 and 2-1 where the compounding amount of the polyolefin (B) exceeded the range of the present invention, sufficient roll workability and extrusion property were not obtained. The rubber compositions of Reference Examples 1-1 and 1-2 neither provided sufficient roll workability and extrusion property.

While the present invention has been described in detail and with reference to specific embodiments thereof, it will be apparent to one skilled in the art that various changes and modifications can be made therein without departing from the spirit and scope thereof.

This application is based on Japanese Patent Application Nos. 2009-140961 (filed Jun. 12, 2009) and 2010-103579 (filed Apr. 28, 2010), and the contents thereof are herein incorporated by reference.

Industrial Applicability

The rubber composition of the present invention improved in the specific gravity is suitably used particularly for the production of a vehicle member. Examples of the vehicle member include glass run, sunroof weather strip, roof side weather strip, door outer weather strip, drip weather strip, trunk weather strip, side mold, opening trim weather strip, and various packing materials for electric installation.

What is claimed is:

1. A vulcanizable rubber composition containing (A) an ethylene/α-olefin/nonconjugated polyene copolymer rubber, (B) a polyolefin resin and (C) only a single blowing agent, wherein
   the polyolefin resin (B) is microdispersed in a melted state in the ethylene/α-olefin/nonconjugated polyene copolymer rubber (A), the polyolefin resin (B) having an average dispersed particle diameter of 2 μm or less,
   the polyolefin resin (B) is present in an amount of from 5 to 15 parts by mass per 100 parts by mass of the ethylene/α-olefin/nonconjugated polyene copolymer rubber (A),
   the blowing agent (C) is present in an amount of from 2 to 6 parts by mass per 100 parts by mass of the ethylene/α-olefin/nonconjugated polyene copolymer rubber (A), and
   the vulcanizable rubber composition has a specific gravity of from 1.05 to 1.15 and a Mooney viscosity (Vm) at 125° C. of from 25 to 55,
   wherein the blowing agent (C) consists of a thermally expandable capsule.

2. The rubber composition as claimed in claim 1, wherein the thermally expandable capsule has an average particle diameter before expansion of from 3 to 20 μm.

3. The rubber composition as claimed in claim 1, which provides a vulcanized composition having a specific gravity of from 0.5 to 0.8, a hardness of from 35 to 65, a tensile strength of from 3.5 to 7 MPa, an elongation of from 100 to 500%, and a compression set at 70° C. for 72 hours of from 30 to 50%.

4. A rubber product with a specific gravity of from 0.5 to 0.8, obtained by vulcanizing the rubber composition claimed in claim 1.

5. The rubber composition as claimed in claim 1, wherein the thermally expandable capsule has a maximum expansion temperature of from 130 to 150° C.

6. The rubber composition as claimed in claim 1, wherein the Mooney viscosity (Vm) at 125° C. is 25 to 50.

7. The rubber composition as claimed in claim 6, which provides a vulcanized composition having a specific gravity of from 0.5 to 0.75.

8. The rubber composition as claimed in claim 6, which provides a vulcanized composition having a specific gravity of from 0.5 to 0.75, a hardness of from 35 to 65, a tensile strength of from 3.5 to 7 MPa, an elongation of from 100 to 500%, and a compression set at 70° C. for 72 hours of from 30 to 50%.

9. The rubber composition as claimed in claim 6, wherein the thermally expandable capsule has a maximum expansion temperature of from 130 to 150 ° C.

10. The rubber composition as claimed in claim 8, wherein the thermally expandable capsule has a maximum expansion temperature of from 130 to 150° C.

11. The rubber compositions as claim 1, wherein the money viscosity (Vm) at 125° C. is from 30 to 50.

* * * * *